(12) United States Patent
Balcon et al.

(10) Patent No.: US 8,487,561 B2
(45) Date of Patent: Jul. 16, 2013

(54) SOFTSTARTER DEVICE AND METHOD TO CONTROL THE SOFTSTARTING OF AN ELECTRIC MOTOR

(75) Inventors: Claudio Balcon, Belluno (IT); Jason Demicoli, Zejtun (MT); Thomas Ellul, Tarxien (MT); Johann Galea, St. Julian's (MT); Roger Galea, Luqa (MT); Mauro Perot, Santa Giustina (IT); Francesco Vedana, Belluno (IT)

(73) Assignee: Carlo Gavazzi Services AG, Steinhausen (CH)

( * ) Notice: Subject to any disclaimer, the term of this patent is extended or adjusted under 35 U.S.C. 154(b) by 336 days.

(21) Appl. No.: 12/806,988

(22) Filed: Aug. 25, 2010

(65) Prior Publication Data

US 2011/0050155 A1    Mar. 3, 2011

(30) Foreign Application Priority Data

Sep. 2, 2009 (EP) .................................... 09169226

(51) Int. Cl.
*H02P 6/04* (2006.01)
(52) U.S. Cl.
USPC ............ 318/400.11; 318/400.01; 318/400.06; 318/400.07; 318/400.22; 318/434; 318/268; 318/799; 318/430
(58) Field of Classification Search
USPC ............. 318/400.11, 400.22, 400.21, 400.01, 318/400.06, 400.07, 400.1, 400.38, 779, 318/799, 268, 430, 434; 323/238, 242
See application file for complete search history.

(56) References Cited

U.S. PATENT DOCUMENTS

| | | | |
|---|---|---|---|
| 4,580,084 A | | 4/1986 | Takahashi et al. |
| 4,963,810 A | * | 10/1990 | Rojas et al. ................... 318/778 |
| 5,770,934 A | * | 6/1998 | Theile ........................... 318/469 |
| 6,163,129 A | * | 12/2000 | Younger et al. .............. 318/799 |
| 6,690,129 B1 | | 2/2004 | Sutter et al. |
| 6,781,342 B2 | * | 8/2004 | Tolbert et al. ................ 318/784 |
| 6,995,534 B2 | * | 2/2006 | Berroth et al. .......... 318/400.22 |
| 7,342,371 B2 | * | 3/2008 | Zuzuly et al. ................ 318/434 |
| 2004/0056617 A1 | | 3/2004 | Berroth et al. |
| 2004/0135534 A1 | | 7/2004 | Cullen |

FOREIGN PATENT DOCUMENTS

| | | |
|---|---|---|
| EP | 1 914 875 | 4/2008 |
| WO | WO 02/060046 | 8/2002 |

OTHER PUBLICATIONS

European Search Report dated Sep. 24, 2009.

* cited by examiner

*Primary Examiner* — Antony M Paul
(74) *Attorney, Agent, or Firm* — Collard & Roe, P.C.

(57) ABSTRACT

A self-adapting soft-starter device includes an electric current limiter limiting electric current supplied to the motor to a preset maximum current limit, a ramp-up time determiner determining the actual ramp-up time of the electric motor, a storing device storing a preset minimum ramp-up time, a comparator comparing the determined actual ramp-up time with the preset reference ramp-up time, a replacing device replacing the preset maximum current limit with an auto-adapted current limit based upon the outcome of the comparison between the determined actual ramp-up time and the preset reference ramp-up time. The soft-starter automatically optimizes the maximum current limit driven by the motor to match its load requirements which is useful to cater for load variations with time during the lifetime of the product in the application by avoiding the need for human intervention to change the soft-starter settings. Wear and tear is also reduced, extending motor lifetime.

8 Claims, 2 Drawing Sheets

SOFTSTARTER DEVICE AND METHOD TO CONTROL THE SOFTSTARTING OF AN ELECTRIC MOTOR

CROSS REFERENCE TO RELATED APPLICATIONS

Applicants claim priority under 35 U.S.C. §119 of European Application No. 09169226.9 filed on Sep. 2, 2009, the disclosure of which is incorporated by reference.

FIELD OF THE INVENTION

The invention relates to a softstarter device and method to control the softstarting of an electric motor.

BACKGROUND OF THE INVENTION

Softstarter tools are commonly known in the prior art. They are used to start or stop a motor avoiding electrical surges, sudden overheating of motors, mechanical stresses and shocks, wearing out material and mechanical damage in the driven apparatus.

EP 1 914 875 A1 discloses a motor starter device adapted for controlling an electric motor connected to the device especially during a start or a stop of the motor. The prior art softstarter device comprises calculating means for calculating a difference between a determined motor torque and a reference value for the motor torque, and calculating an error signal from the comparison between said calculated torque and the reference value to change the speed of the motor. The softstarter device also comprises means for reducing the speed of said motor and the rate of change of motor speed with respect to time during a stopping time interval. The speed of said motor is reduced dependent on said error signal so that the rate of change of motor speed with respect to time during a stopping time interval varies at least between a first part of the time interval and a second part of the time interval.

When the electric motor load is changed, the softstarter should be adjusted to conform to the requirements of the new aggregates. This is often a tedious and time-consuming procedure and—in the worst case—it may be forgotten. The aggregates which are to be driven by the electric motor may sometimes undergo a change in the required torque due to changing of conditions (such as increasing or decreasing back pressure in a pump or compressor or material ageing).

SUMMARY OF THE INVENTION

It is the aim of the present invention to provide a new soft starter device and a new method for soft-starting an electric motor that is able to adapt and optimize the starting current, when controlling a motor, which drives a load, such as a compressor. The starting current must be optimized automatically for different sizes of loads. Furthermore the performance will be continuously optimized to cater for ageing of the materials, especially in the load.

In a first aspect of the invention this aim is obtained by a soft starter device which is connected to an electric motor and to a power supply as claimed in claim 1. Such a soft starter device comprises:
  an electrical current limiting means adapted to limit the starting current supplied to the motor to a preset maximum current limit,
  a ramp-up time determination means adapted to determine the actual ramp-up time of the electric motor,
  a storing means adapted to store a preset reference ramp-up time,
  a comparing means adapted to compare the determined actual ramp-up time with said preset reference ramp-up time,
  a replacing means adapted to replace said preset maximum current limit with an automatically adapted current limit in case said determined actual ramp-up time is below/above the preset reference ramp-up time.

The softstarter device starts the electric motor connected to the load using a maximum current limit to guarantee a good start. The current limit for the next start will be determined based upon the measurement of the starting current and the ramp up time. This process of auto adaptation leads to an optimization of the load starting current. This can happen at the installation of the softstarter device in the system as well as during its subsequent operation in the application. This process will continue till the end of the softstarter device operating life.

According to a preferred embodiment of the soft starter device, said ramp-up time determination means is based on the analysis of the current waveform. As long as the auto-adapted current limit is less than the preset maximum current limit and the determined actual ramp-up time differs from the said reference ramp-up time, the soft-starter device will adjust the said auto-adapted current limit.

According to a further embodiment of the invention the soft starter device includes diagnostic functions which are adapted to stop the starting process when the electric motor cannot be started with the preset maximum current limit.

A still further embodiment of the soft starter device provides a counting means which is adapted to count and store the number of starts. The number of starts gives valuable information to the service or repair team.

According to a second aspect of the invention the above-mentioned problem is solved by a method of soft-starting an electric motor comprising the steps of:
  presetting a reference ramp-up time,
  presetting a maximum current limit and limiting the electric current supplied to the motor to said maximum current limit,
  starting said motor,
  determining the actual ramp-up time of the electric motor,
  comparing the determined actual ramp-up time with said preset reference ramp-up time,
  auto-adjusting said preset current limit with a lower/higher current limit depending on said determined actual ramp-up time.

A further preferable embodiment of the method of the invention provides switching off the soft starting process and generating an alarm signal when the electric motor fails to start even when the maximum current limit has been reached.

According to a further preferable embodiment of the method of the invention the method comprises counting and storing the number of starts.

The present invention will be described in more detail in connection with the enclosed schematic drawings.

Figure 1:
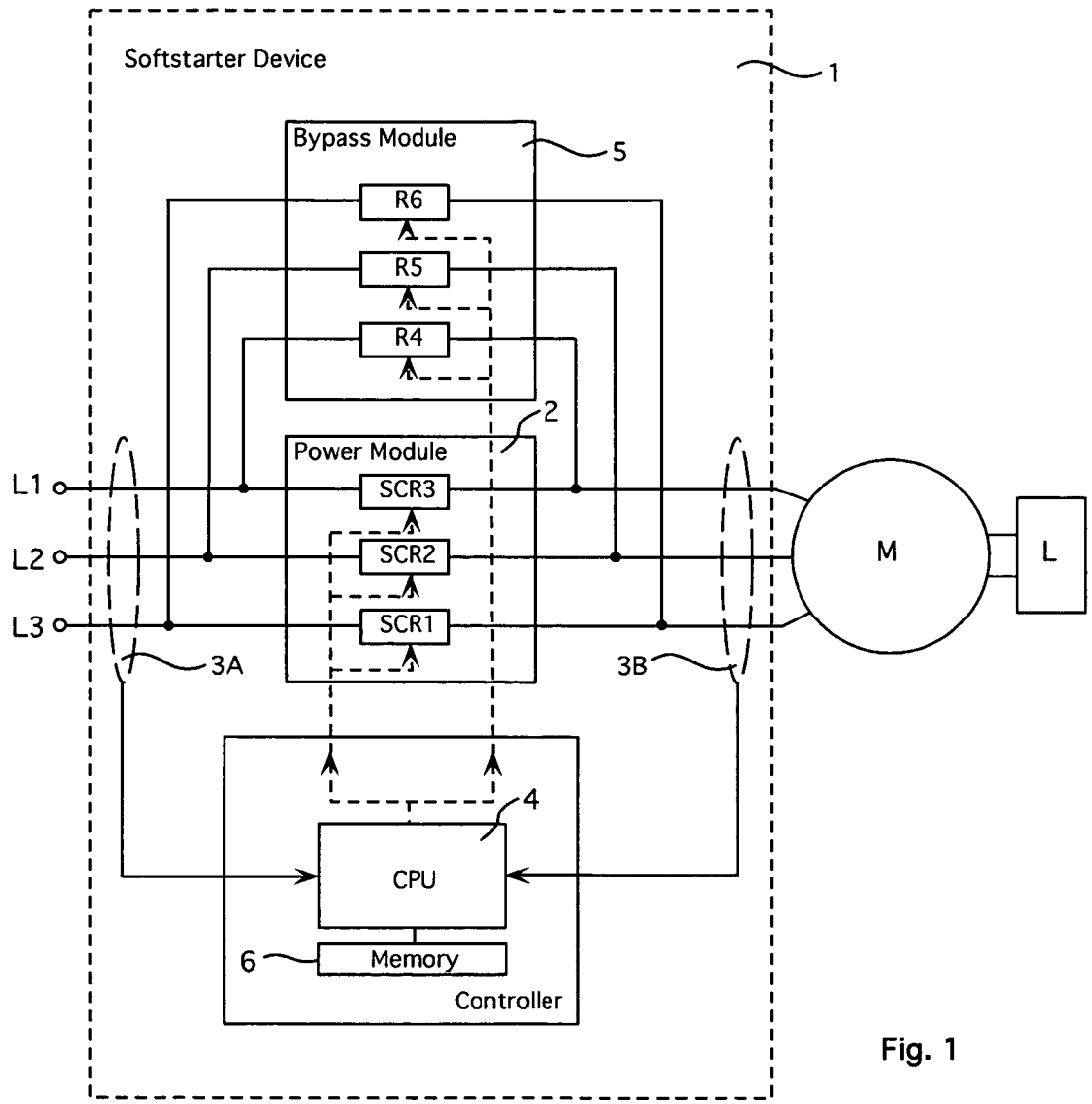
FIG. 1 shows schematically a soft-starter device according to an embodiment of the invention.

FIG. 1 shows the soft-starter device 1 which is connected to a three-phase AC supply, symbolized by L1, L2 and L3. The three phase AC current is just given as an example. The soft-starter device according to the invention can be applied also for a single phase AC current, i.e. using for example only L1 and a ground line as well as for three phase softstarter devices with different control configurations, eg. three-phase softstarter with two-phase control. The soft-starter device 1/the soft-starter devices is/are also connected to a motor M, which is mechanically connected to a load L, such as a compressor.

The soft-starter 1 includes a power module 2 having for each phase a semiconductor relay, namely semiconductor switches SCR1, SCR2, SCR3.

The soft-starter 1 further includes a bypass module 5 having for each phase a relay, namely relays R4, R5, R6. The relays R4, R5 and R6 are coupled parallel respectively to the semiconductor switches SCR1, SCR2 and SCR3 of the power module 2.

The soft-starter further includes a controller including a CPU 4 (Central processing Unit) and a memory 6.

A group of sensors 3A and 3B are provided at the input side and output side of the power module 2. The sensors 3A and 3B are symbolized by circles which surround the input and output lines of the power module 2. The sensors 3A and 3B measure current flow, voltage, phase angle of the three lines L1, L2 and L3. The result of the measurements are delivered to the CPU 4 of the controller.

Based on the measurement data, the CPU 4 generates control signals which are delivered to the semiconductor relays SCR1, SCR2, SCR3 and to the relays R4, R5, R6.

The CPU 4 is connected to the control ports of semiconductor relays SCR1, SCR2, SCR3 and relays R4, R5, R6. When the soft-starter is in a state where the motor should be fully supplied with the electrical current, the relays R4, R5, R6 bypass the semiconductor relays SCR1, SCR2, SCR3 in order to decrease the total resistance and avoid production of heat, thereby avoiding waste of electrical power.

Figure 2:
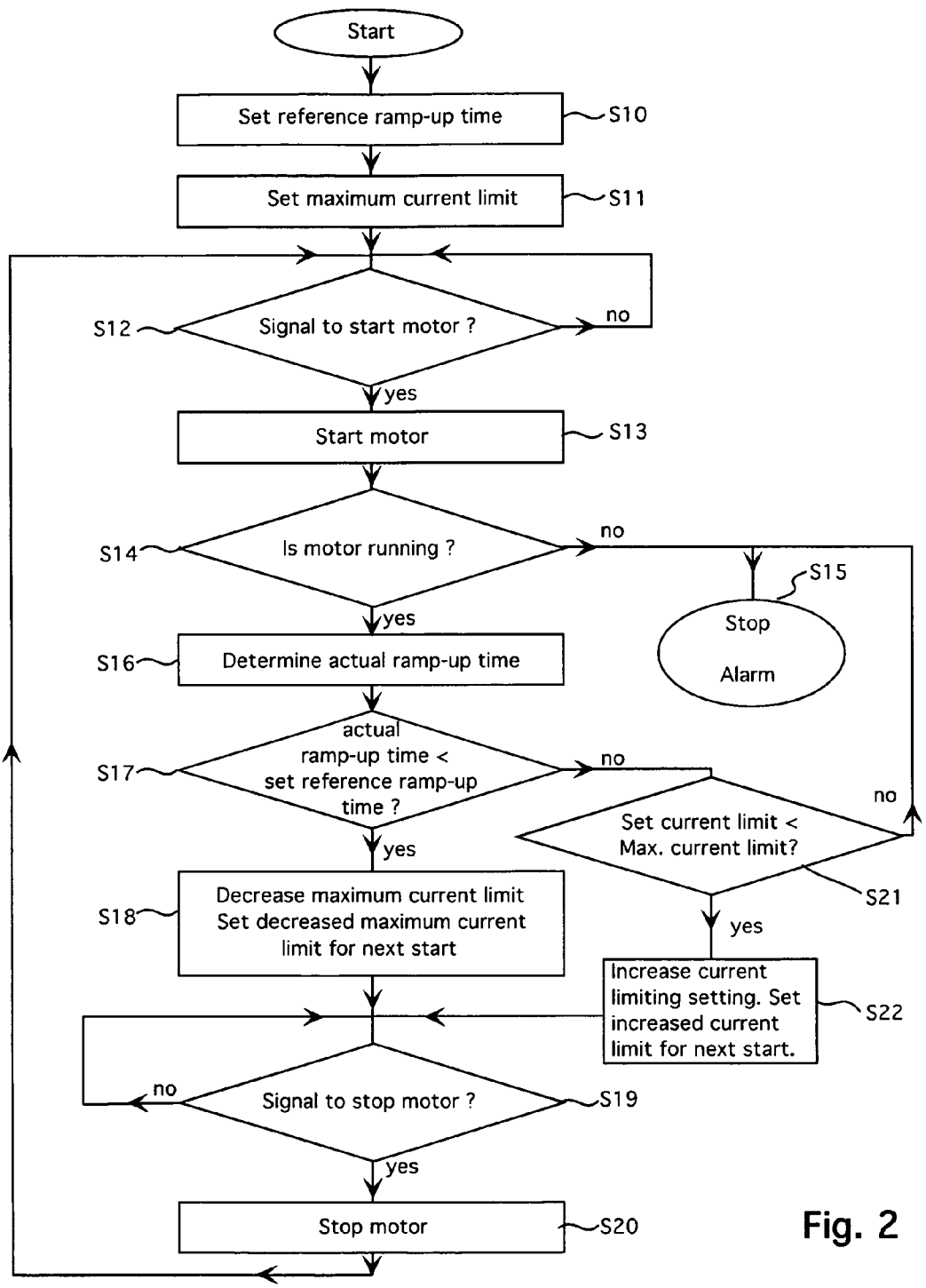
FIG. 2 shows a flow diagram explaining the function of the soft-starter device.

FIG. 2 shows a flow diagram explaining the method and function of the soft-starter device according to a preferred embodiment of the invention.

At step S10 of the flow-chart the reference ramp-up time will be set during the device initialisation.

At step S11 the maximum current limit will be set during the device initialisation. A large value of the maximum current limit will result in a short ramp-up time.

After having set the two data in steps S10 and S11 the motor is ready for starting. When the CPU receives a signal to start the motor (step S12), then the motor is started as shown in step S13.

Step 14 checks whether the motor has begun to work. If—after reaching the maximum current limit—the motor failed to start, the process moves to step S15, where the starting procedure is cancelled and an alarm may be given. This may occur when the load is extremely high—e.g. in a locked rotor condition—and/or the maximum current limit is extremely low.

Normally, however, the procedure will move to step S16, where the CPU determines the actual ramp-up time, i.e. the time which has been required by the motor to reach the final rotational speed starting from zero.

In step S17 the determined actual ramp-up time is compared with the reference ramp-up time, which has been set in step S10. If the actual ramp-up time is shorter than the set reference ramp-up time, then the procedure advances to step S18, where the maximum current limit will be decreased and the decreased maximum current limit will replace the maximum current limit set in step S11. For the next start the decreased maximum current limit will be used.

However, if in step S17 the actual ramp-up time is larger than the reference ramp-up time, the processing advances to step S21. In step S21 the set current limit is compared with the maximum current limit. If the set current limit is smaller than the maximum current limit, the procedure advances to step S22, where the current limiting setting is increased and the increased current limit is set for the next start and the process moves to step S19. Once a "signal to stop the motor" will be received, the procedure advances to step S20 according to which the motor will be stopped. Then the processing advances to step S12, where the system waits for a "signal to start the motor".

However, if in step S21 the set current limit is not smaller than the maximum current limit, the process moves to step S15 and the starting procedure is stopped and an alarm may be given.

Due to the effected decrease of the maximum current limit in step S18, for the next start the actual ramp time will probably be larger as the set reference ramp time and step S18 will be skipped. However, if the actual ramp-up time will still be shorter than the set reference ramp-up time a further decrease of the maximum current will be done in step S18 and the procedure will be repeated until a steady state will have been reached.

The invention claimed is:

1. Soft starter device which is adapted to be connected to an electric motor (M) and to a power supply, the soft starter device (1) comprising
  an electrical current limiting means (2, 4, S11) adapted to limit the electric current supplied to the motor (M) to a preset maximum current limit,
  a ramp-up time determination means (3A, 3B, 4) adapted to determine the actual ramp-up time of the electric motor (M), said actual ramp-up time being the time which has been required by the motor to reach a final rotational speed starting from zero,
  a storing means (6,4, S10) adapted to store a preset reference ramp-up time,
  a comparing means (4, S17) adapted to compare the determined actual ramp-up time with said preset reference ramp-up time,
  a replacing means (4, S18) adapted to replace said preset maximum current limit by auto-adjusting said preset current limit with a lower/higher current limit depending on said determined actual ramp-up time.

2. Soft starter device according to claim 1, wherein said ramp-up time determination means (3A, 3B, 4) is based on the analysis of a current waveform.

3. Soft starter device according to claim 1, wherein said electric motor (M) is mechanically connected to a load (L).

4. Soft starter device according to claim 3, wherein said load (L) is a compressor.

5. Soft starter device according to claim 1, comprising switch-off means (S15) which are adapted to switch off the soft starting process when the electric motor (M) is not running even when the maximum current limit has been reached.

6. Method for soft-starting an electric motor (M) comprising the following steps:
  setting a reference ramp-up time (S10),
  setting a maximum current limit (S11),
  starting said motor (S13)
  determining the actual ramp-up time (S16) of the electric motor (M), said actual ramp-up time being the time which has been required by the motor to reach a final rotational speed starting from zero,
  comparing the determined actual ramp-up time with said preset minimum ramp-up time (S17),
  replacing said preset maximum current limit with a lower maximum current limit in case said reference ramp-up time exceeds said determined actual ramp-up time (S18)

replacing said maximum limit with a lower/higher setting current limit based upon the outcome of the comparison performed in step S17 and/or S21 (S18 and S22).

7. Method according to claim 6, wherein said ramp-up time determination (S16) is based on the analysis of a current waveform.

8. Method according to claim 6,
comprising a step of switching off the soft starting process and generating an alarm signal when the electric motor fails to run even when the maximum current limit has been reached (S14, S15).

\* \* \* \* \*